United States Patent
Bawolek et al.

(10) Patent No.: US 6,205,244 B1
(45) Date of Patent: Mar. 20, 2001

(54) METHOD FOR IMAGER DEVICE COLOR CALIBRATION UTILIZING LIGHT-EMITTING DIODES OR OTHER SPECTRAL LIGHT SOURCES

(75) Inventors: Edward J. Bawolek, Chandler; Lawrence A. Booth, Jr., Phoenix; Curt Corum, Chandler; William P. Kuhn, Tucson, all of AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/102,875

(22) Filed: Jun. 23, 1998

(51) Int. Cl.[7] .............................. G06K 9/00; G03F 3/08; H04N 17/00
(52) U.S. Cl. .................... 382/162; 382/167; 358/518; 348/187
(58) Field of Search ................................. 382/162, 167; 358/504, 516, 518; 348/20, 101, 182, 223, 267–270, 272, 370, 187

(56) References Cited

U.S. PATENT DOCUMENTS 5,414,537 * 5/1995 Omuro et al. ....................... 358/518

* cited by examiner

Primary Examiner—Leo H. Boudreau
Assistant Examiner—Dmitry A. Novik
(74) Attorney, Agent, or Firm—Blakely, Sokoloff, Taylor & Zafman LLP

(57) ABSTRACT

A method and apparatus for color calibrating an imager device is disclosed. The imager device is subjected to a plurality of light sources. Color channel responses are obtained from the imager device and the color calibrating coefficients are determined.

5 Claims, 8 Drawing Sheets

| N IMAGER DEVICES | IMAGER DEVICE RESPONSES TO LEDs | | | | | | | | | 3X3 MATRIX COEFFICIENTS | | | |
|---|---|---|---|---|---|---|---|---|---|---|---|---|---|
| | $R_{D1}$ | ••• | $R_{D5}$ | $G_{D1}$ | ••• | $G_{D5}$ | $B_{D1}$ | ••• | $B_{D5}$ | $M_{11}$ | $M_{12}$ | ••• | $M_{33}$ |
| 1 | | | | | | | | | | | | | |
| 2 | | | | | | | | | | | | | |
| 3 | | | | | | | | | | | | | |
| ⋮ | | | | | | | | | | | | | |
| $N_{ID}$ | | | | | | | | | | | | | |

FIG. 6

METHOD FOR IMAGER DEVICE COLOR CALIBRATION UTILIZING LIGHT-EMITTING DIODES OR OTHER SPECTRAL LIGHT SOURCES

BACKGROUND OF THE INVENTION (1) Field of the Invention

The present invention is generally related to the verification and calibration of color as well as corrective adjustments for an imaging device.

(2) Background Information

Color is basically what the human visual system perceives on receiving various wavelengths of light that have reflected off objects. This color recognition is also known as the spectral sensitivity of the human visual system. To express the perceived colors numerically, many methods have been developed of which one of them is the XYZ tristimulus values as developed by an international organization known as "Commission Internationale de l'Eclairge" (CIE). The XYZ tristimulus values are based on the theory that the human visual system possesses receptors for three primary colors red, green, and blue and that all the colors perceived are mixtures of these three primary colors.

FIG. 1 illustrates the spectral sensitivity corresponding to the human visual system in terms of XYZ tristimulus values. Ideally, if imager device response channels were to exactly duplicate the XYZ tristimulus values, in theory, that imager device could be capable of exactly duplicating the colors seen by the human visual system. However, due to the complexities involved in producing such an imager device, it is not practical to exactly duplicate the XYZ tristimulus values.

FIG. 2 illustrates an exemplary red, green and blue response of an imager device. It is desirable to transform the response to be as closely correlating as possible to the XYZ tristimulus values so that the imager device may channel outputs that closely correspond to the color seen by the human visual system. This is the function of color calibration that is performed on the imager device.

The function of the color calibration is to find a color calibrating matrix (e.g., a 3×3 matrix) that brings the response of the image sensor as close as possible (i.e., least squares error) to that of the XYZ tristimulus values. An exemplary method of determining the color calibrating 3×3 matrix is to take several reflective color targets of known XYZ tristimulus values such as a rendition chart having the Macbeth Colorchecker® targets available from Macbeth/Kollmorgen Instruments Corporation in New Windsor, N.Y., that represent twenty-four colors and generally depict the colors in various regions of the color space. By taking the corresponding red, green and blue (RGB) values generated by the image device, a calibrating matrix that closely represents the XYZ tristimulus values of the targets is found. Mathematically, the transformation may be represented as follows:

Using the imager device to be calibrated, twenty-four color targets having known X Y Z tristimulus target values are read (measured) by the imager to produce responses in the imager. From these responses, the imager generates the corresponding RGB values. Note that each X Y Z tristimulus values for the color targets are known. The measured RGB values are loaded into a measured data matrix (MEAS), an example being:

| Target 0  | $R_0$    | $G_0$    | $B_0$    |
| Target 1  | $R_1$    | $G_1$    | $B_1$    |
| Target 2  | $R_2$    | $G_2$    | $B_2$    |
| Target 3  | $R_3$    | $G_3$    | $B_3$    |
| .         | .        | .        | .        |
| .         | .        | .        | .        |
| .         | .        | .        | .        |
| Target 22 | $R_{22}$ | $G_{22}$ | $B_{22}$ |
| Target 23 | $R_{23}$ | $G_{23}$ | $B_{23}$ |

The relationship between the RGB values and the XYZ tristimulus values can be represented by the equation:

$$\begin{bmatrix} X \\ Y \\ Z \end{bmatrix} = [3 \times 3] \begin{bmatrix} R \\ G \\ B \end{bmatrix}$$

The 3×3 color calibrating matrix can be further specified as:

$$[3 \times 3] = \begin{bmatrix} M_{11} & M_{12} & M_{13} \\ M_{21} & M_{12} & M_{23} \\ M_{31} & M_{12} & M_{33} \end{bmatrix}$$

Where $M_{11}, \ldots, M_{33}$ are the desired color calibrating coefficients of the color calibrating matrix.

Thus, the color calibrating coefficients are computed as follows:

$$\begin{bmatrix} M_{11} \\ M_{12} \\ M_{13} \end{bmatrix} = (MEAS^T \cdot MEAS)^{-1} \cdot MEAS^T \begin{bmatrix} X_0 \\ X_1 \\ \vdots \\ X_{23} \end{bmatrix}$$

$$\begin{bmatrix} M_{21} \\ M_{22} \\ M_{23} \end{bmatrix} = (MEAS^T \cdot MEAS)^{-1} \cdot MEAS^T \begin{bmatrix} Y_0 \\ Y_1 \\ \vdots \\ Y_{23} \end{bmatrix}$$

$$\begin{bmatrix} M_{31} \\ M_{32} \\ M_{33} \end{bmatrix} = (MEAS^T \cdot MEAS)^{-1} \cdot MEAS^T \begin{bmatrix} Z_0 \\ Z_1 \\ \vdots \\ Z_{23} \end{bmatrix}$$

A matrix may be thought of as a rectangular column and row array of numeric or algebraic quantities subject to mathematical operations. A transpose is a matrix formed by interchanging the rows and columns of a given matrix. In the above expression, $MEAS^T$ refers to the transpose of MEAS matrix. $(\ )^{-1}$ denotes an inverse. Further, Xn, Yn, Zn are XYZ tristimulus values of the respective targets n.

The least-squares method is a method to obtain the best values (the ones with least error) of unknown quantities that are supposed to satisfy a system of linear equations, such as may be expressed by matrices. From above, the color calibrating coefficients $M_{11}, \ldots, M_{33}$ are selected to provide the minimized least squares error that corresponds to the best fit for mapping the measured RGB values of the imager device into the XYZ tristimulus values of the color targets. It may not be immediately apparent why the coefficients obtained through this method would provide the least squares error and further discussion can be found in Box, Hunter and Hunter, "Statistics for Experimenters" (John Wiley and Sons, New York, 1978) at page 498–502. It is desirable that the coefficient values be calculated and stored with a minimum of three significant digits of accuracy. Note that as long as the proper luminance is provided against the rendition chart targets (or target chips), the magnitudes of the coefficients are not important but only the ratios between the coefficients. Thus, the matrices:

$$M = \begin{pmatrix} 16.645 & 7.013 & 1.253 \\ 6.997 & 17.706 & -1.881 \\ 0.386 & -4.826 & 23.327 \end{pmatrix} \text{ and}$$

$$M = \begin{pmatrix} 33.29 & 14.026 & 2.506 \\ 13.994 & 35.411 & -3.762 \\ 0.772 & -9.652 & 46.655 \end{pmatrix}$$

are equivalent in terms of their color calibrating accuracy.

While the method of individually calibrating each imager device by exposing that device to the target chips of a rendition chart is fundamentally correct in its approach, it is cumbersome to implement in high volume production. For example, multiple color targets, typically twenty-four, are required to accumulate the tested imager device's response to the Macbeth Colorchecker®. In other words, twenty-four color targets are imaged sequentially for each imager device being calibrated. This technique requires substantial amount of time which hinders the flow of production thereby increasing the production cost. Generally, each imager device produced during manufacture is presumed to have its own color calibrating matrix corresponding to the variation in RGB responses and thus, each imager device is calibrated individually. In addition, because the targets are changed frequently during calibration, the targets are subject to possible contamination during handling which results in an inaccurate calibration. Further, the targets may fade with constant exposure to light requiring special storage during non-use and frequent change out. Additionally, because the color of the reflective color targets varies with the luminating light, a reference light source corresponding to CIE D65 illumination is provided that needs to be constantly checked for color temperature and intensity. Furthermore, in using color targets, a fairly large production area must be allocated so that an appropriate target distant relationship exists with the image sensor under calibration. Therefore, what is needed is a method and apparatus for producing the color calibration coefficients or color calibrating matrix without the difficulties associated with the use of reflective color targets.

BRIEF SUMMARY OF THE INVENTION

A method and apparatus for color calibrating an imager device is disclosed. The imager device is subjected to a plurality of light sources. Color channel responses are obtained from the imager device and the color calibrating coefficients are determined.

BRIEF DESCRIPTION OF THE DRAWINGS

The objects, features and advantage of the method and apparatus for the present invention will be apparent from the following description in which:

FIG. 6 illustrates an exemplary table used for correlating the imager devices' responses;

DETAILED DESCRIPTION OF THE INVENTION

The present invention uses a set of light emitting diodes (LEDs) or other light sources to provide a stimuli for the imager device to produce a color calibration matrix. In so providing, many of the disadvantages of using reflective color targets are overcome. It will be appreciated that one characteristic feature of LEDs is that LEDs have a high degree of light output stability. It will also be appreciated that the light sources will be understood to mean originating or radiating light sources. It will further be appreciated that the present invention can be practiced with both Complementary Metal Oxide Semiconductor (CMOS) devices and Charge-Coupled Device (CCD) as well as other imager devices. It will further be appreciated that while the exemplary embodiment is described in terms of red, green and blue (RGB) response, it should by no means be construed as a limitation. Other color systems are equally applicable, for example, cyan magenta yellow (CMY) color system and cyan, magenta, yellow, green (CMYG) color system among others. Accordingly, the responses from the various color systems will be collectively referred to as color channel responses. Furthermore, it will be appreciated that while the exemplary embodiment is described in terms of 3×3 matrix, other matrices may be used, for example, 3×n matrix or m×n matrix, where m, n are integers, depending on the nature of the color calibration.

Figure 1:
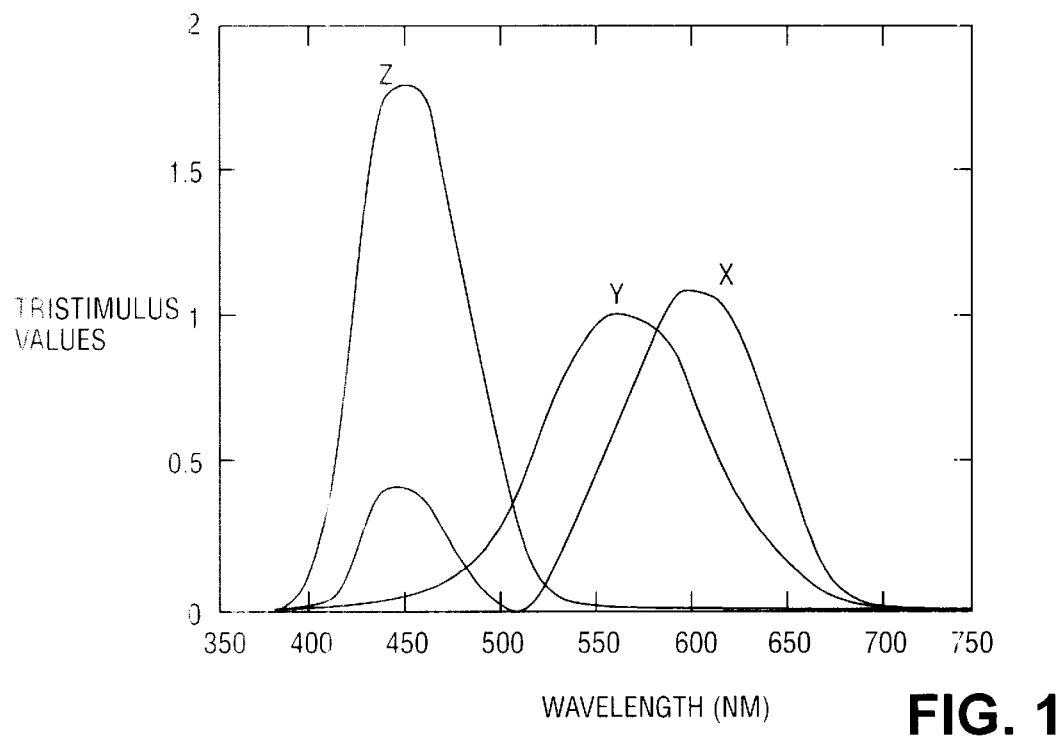
FIG. 1 illustrates the spectral sensitivity corresponding to the human eye in terms of XYZ tristimulus values.
Figure 2:
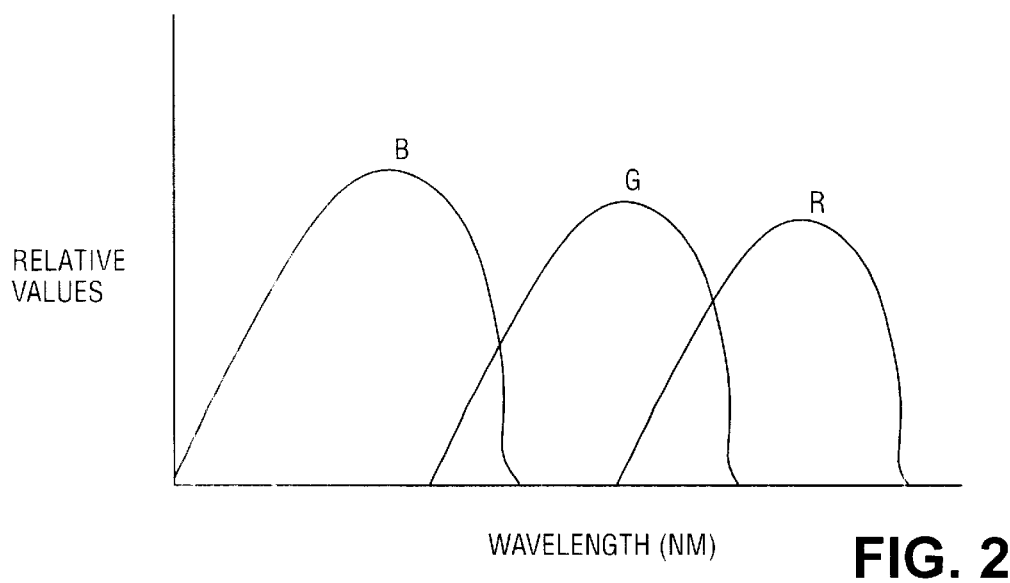
FIG. 2 illustrates an example of a red, blue and green (RGB) response of an imager device.
Figure 3:
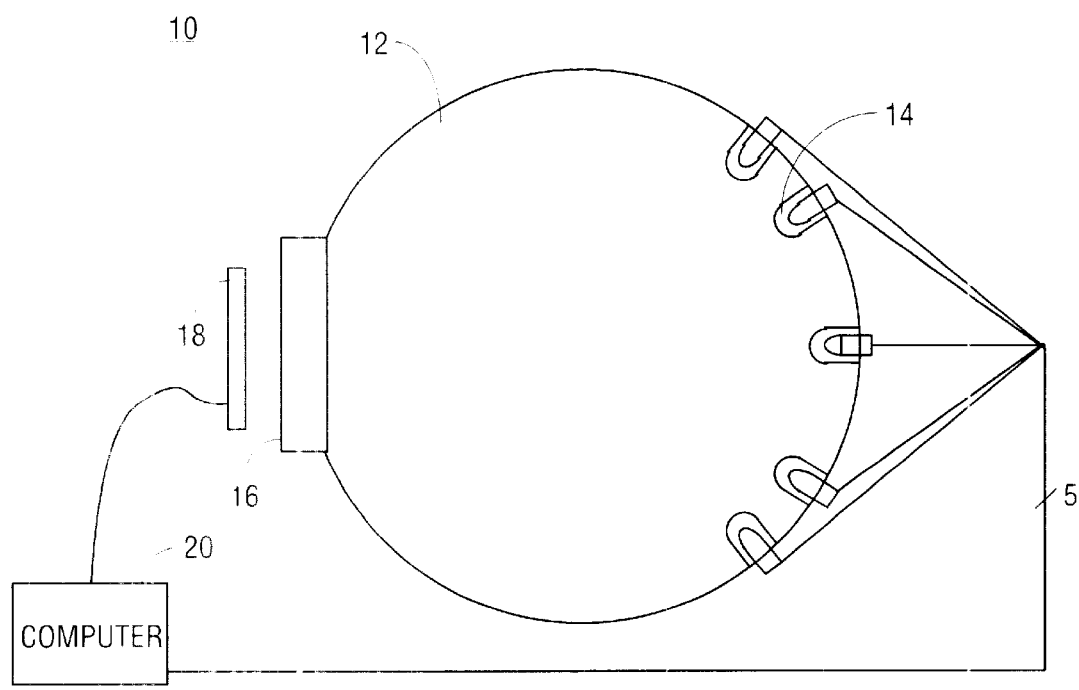
FIG. 3 depicts an exemplary embodiment of the present invention illustrating the calibration instrument.

FIG. 3 illustrates an exemplary embodiment of the invention. The calibration instrument 10 comprises a chamber 12 with an aperture 16 to allow an imager device 18 to be calibrated by its access to the interior of the chamber 12. Within the chamber 12 are incorporated a plurality of LEDs or other light radiation sources 14 that provide the stimuli for the imager device 18. The LEDs or other light radiation sources 14 may be controlled by a computer 20 according to the exemplary methods to be described. The computer 20 may further receive a first set of RGB outputs from the imager device 18 and using those output values, run a color calibration program to produce a 3×3 color calibrating matrix for the imager device 18. The produced 3×3 color calibrating matrix may be stored in a memory device such as read only memory (ROM) within the imager device 18 and is subsequently used to map the read RGB values into corresponding XYZ tristimulus values. By using the calibration instrument 10 to calibrate the various imager devices, reflective color targets are no longer needed. Specifically, by using the LEDs or other light sources 14, the same calibration result can be obtained as would have been with the color targets. Generally, five LEDs are used as indicated by the "5" marked onto the communication line between computer 20 and light radiation sources 14, although more than five LEDs or as low as three LEDs may be used depending on the color region to be covered. In using five LEDs, peak emission wavelengths at 430, 470, 545, 590 and 660 nm are used to provide the stimuli that gives the result as would be obtained by means of calibration with reflective color targets corresponding to the Macbeth Colorchecker® targets. However, it should be noted that other peak wavelengths may be used depending on the particular desired results to be achieved. In this instance, the particular peak wavelengths have been chosen to meet the wavelengths of LEDs that are commercially available while also providing strong correlation with the color coefficients of the color calibrating matrix. The following list specifies diode center wavelengths (in nm) and manufacturer's names:

430 nm Cree Research, Durham, N.C.
450 nm Nichia America Corp., Mountville, Pa.
470 nm Micro Electronics Corp., Santa Clara, Calif.
481 nm Hewlett-Packard, Palo Alto, Calif.
544 nm Toshiba American Electronics Components, Inc., Irvine, Calif.
562 nm Toshiba American Electronics Components, Inc., Irvine, Calif.
590 nm Toshiba American Electronics Components, Inc., Irvine, Calif.
592 nm Hewlett-Packard, Palo Alto, Calif.
612 nm Toshiba American Electronics Components, Inc., Irvine, Calif.
615 nm Hewlett-Packard, Palo Alto, Calif.
637 nm Hewlett-Packard, Palo Alto, Calif.
644 nm Hewlett-Packard, Palo Alto, Calif., Toshiba American Electronics Components, Inc., Irvine, Calif.
660 nm Toshiba American Electronics Components, Inc., Irvine, Calif.

It should be noted that better correlation with the coefficients of the color calibrating matrix may be obtained by using LEDs with band spreads that have wide-bands (i.e., peak wavelength $\pm 50_{nm}$ (nanometers)) as opposed to LEDs with narrow-bands (i.e., wavelength $\pm 5_{nm}$).

As to the remaining figures, various exemplary methods for producing 3×3 color calibrating matrix will now be described in terms of a five LED set, which should not be construed as limitations.

Figure 4:
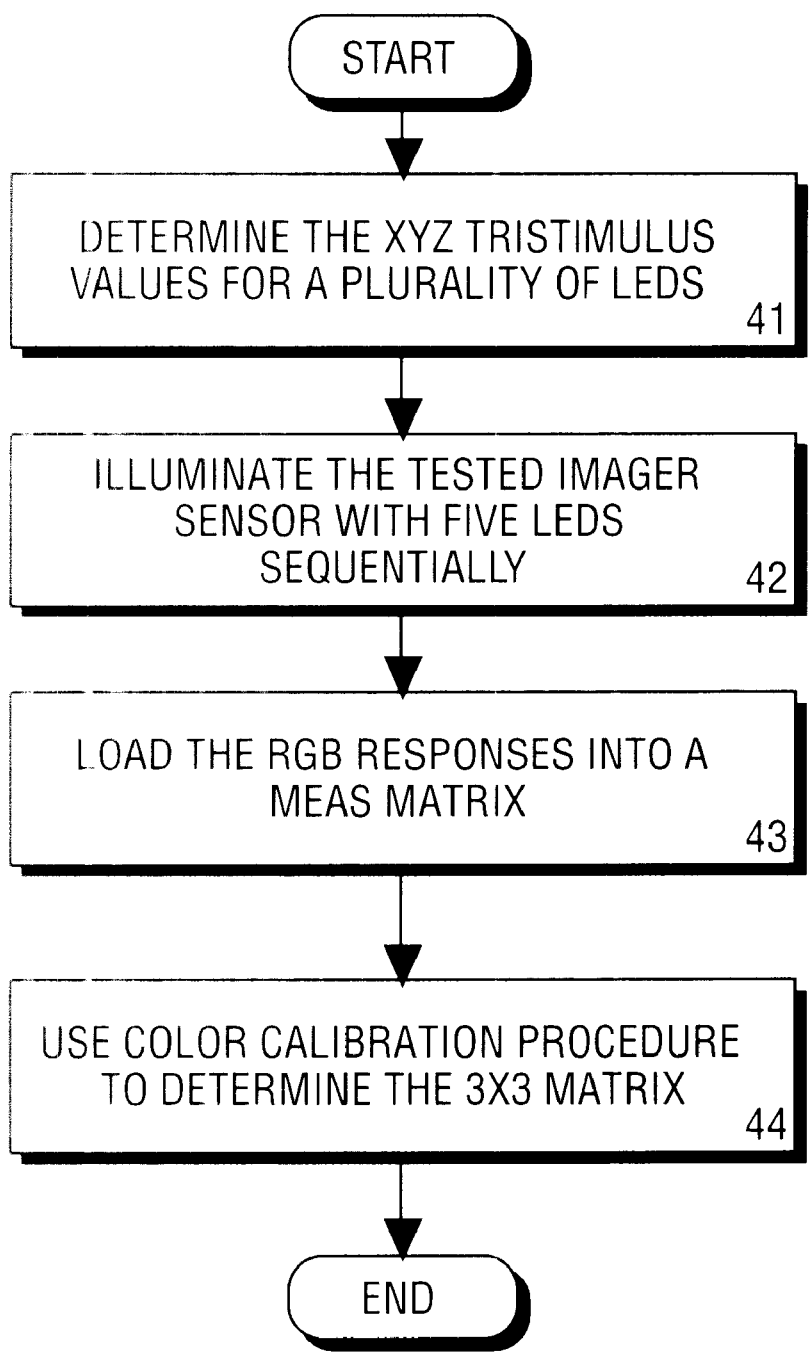
FIG. 4 illustrates an exemplary embodiment of the present invention.

FIG. 4 illustrates an exemplary embodiment of the present invention. In this example, the color calibration to produce the 3×3 color calibrating matrix is directly applied to the RGB values produced by the five LEDs. By applying directly, there is a presumption that the lights of the LEDs are sufficient to define the colors in the various regions of the color space. Therefore, the embodiment does not calibrate by correlating with the Macbeth Colorchecker® targets and may be sufficient to provide adequate color accuracy, depending upon the calibration requirements. The method is as follows:

Block 41 illustrates the steps of determining the XYZ tristimulus values of the LEDs. This may be done through the use of a spectrophotometer. (A spectrophotometer may be viewed as an instrument used to determine the intensity of various wavelengths in a spectrum of light.) Let the five LEDs be represented by:

$X_{D1}, Y_{D1}, Z_{D1}$ is the XYZ Tristimulus Value for LED#1
$X_{D2}, Y_{D2}, Z_{D2}$ is the XYZ Tristimulus Value for LED#2
$X_{D3}, Y_{D3}, Z_{D3}$ is the XYZ Tristimulus Value for LED#3
$X_{D4}, Y_{D4}, Z_{D4}$ is the XYZ Tristimulus Value for LED#4
$X_{D5}, Y_{D5}, Z_{D5}$ is the XYZ Tristimulus Value for LED#5

Block 42 illustrates the imager device to be calibrated being illuminated by the five LEDs sequentially and the RGB responses recorded. Let the RGB responses recorded be:

$R_{D1}, G_{D1}, B_{D1}$ is the imager RGB response to LED#1
$R_{D2}, G_{D2}, B_{D2}$ is the imager RGB response to LED#2
$R_{D3}, G_{D3}, B_{D3}$ is the imager RGB response to LED#3
$R_{D4}, G_{D4}, B_{D4}$ is the imager RGB response to LED#4
$R_{D5}, G_{D5}, B_{D5}$ is the imager RGB response to LED#5

Block 43 illustrates the recorded RGB responses being loaded into a MEAS matrix:

$$MEAS = \begin{bmatrix} R_{D1} & G_{D1} & B_{D1} \\ R_{D2} & G_{D2} & B_{D2} \\ R_{D3} & G_{D3} & B_{D3} \\ R_{D4} & G_{D4} & B_{D4} \\ R_{D5} & G_{D5} & B_{D5} \end{bmatrix}$$

Block 44 illustrates the color calibrating coefficients (i.e. $M_{11}, \ldots, M_{33}$) of the 3×3 matrix are determined by:

$$\begin{bmatrix} M_{11} \\ M_{12} \\ M_{13} \end{bmatrix} = (MEAS^T \cdot MEAS)^{-1} \cdot MEAS^T \begin{bmatrix} X_{D1} \\ X_{D2} \\ \vdots \\ X_{D5} \end{bmatrix}$$

$$\begin{bmatrix} M_{21} \\ M_{22} \\ M_{23} \end{bmatrix} = (MEAS^T \cdot MEAS)^{-1} \cdot MEAS^T \begin{bmatrix} Y_{D1} \\ Y_{D2} \\ \vdots \\ Y_{D5} \end{bmatrix}$$

$$\begin{bmatrix} M_{31} \\ M_{32} \\ M_{33} \end{bmatrix} = (MEAS^T \cdot MEAS)^{-1} \cdot MEAS^T \begin{bmatrix} Z_{D1} \\ Z_{D2} \\ \vdots \\ Z_{D5} \end{bmatrix}$$

Figure 5:
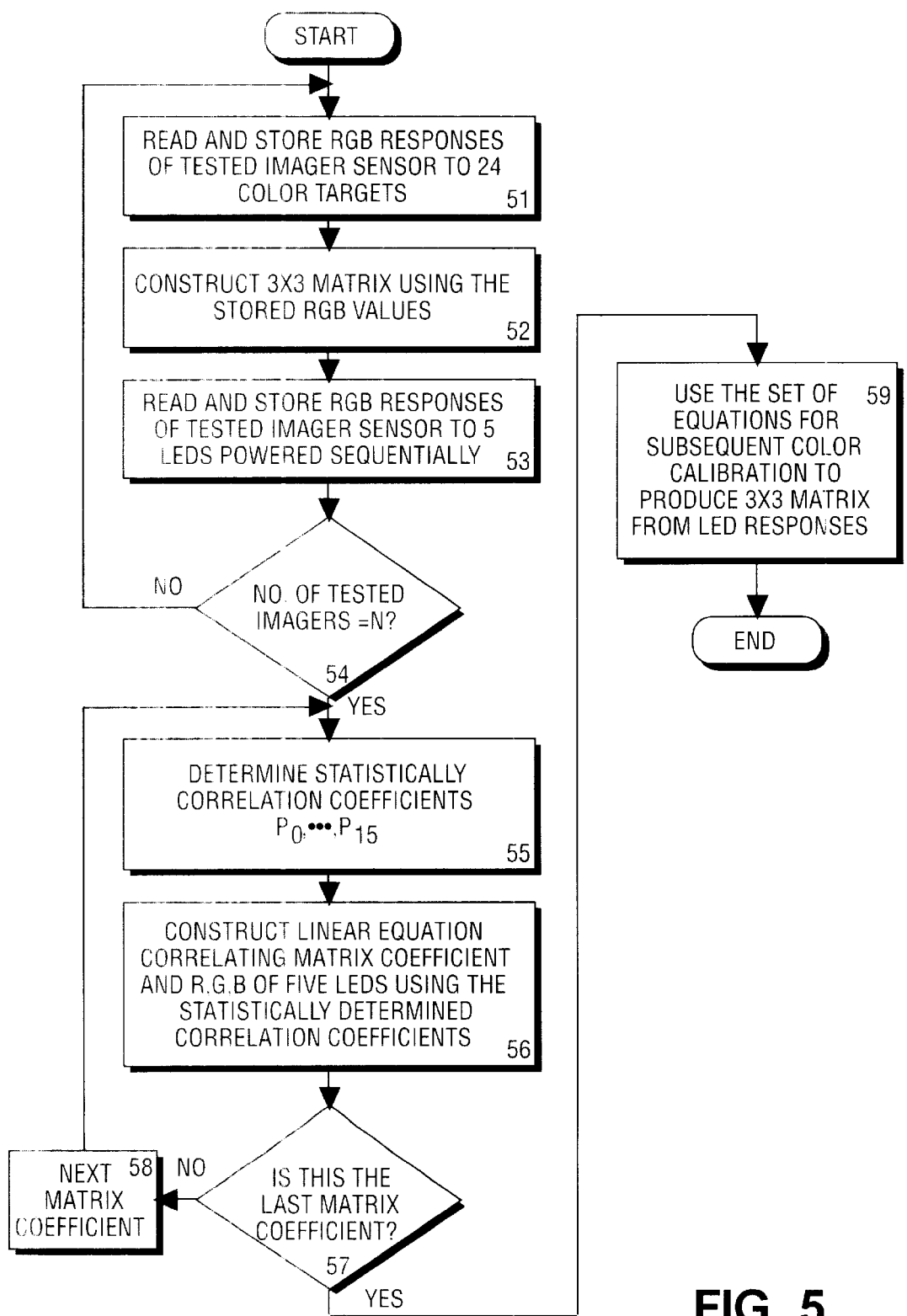
FIG. 5 illustrates an exemplary embodiment of the present invention that uses statistical correlation.
Figure 6:
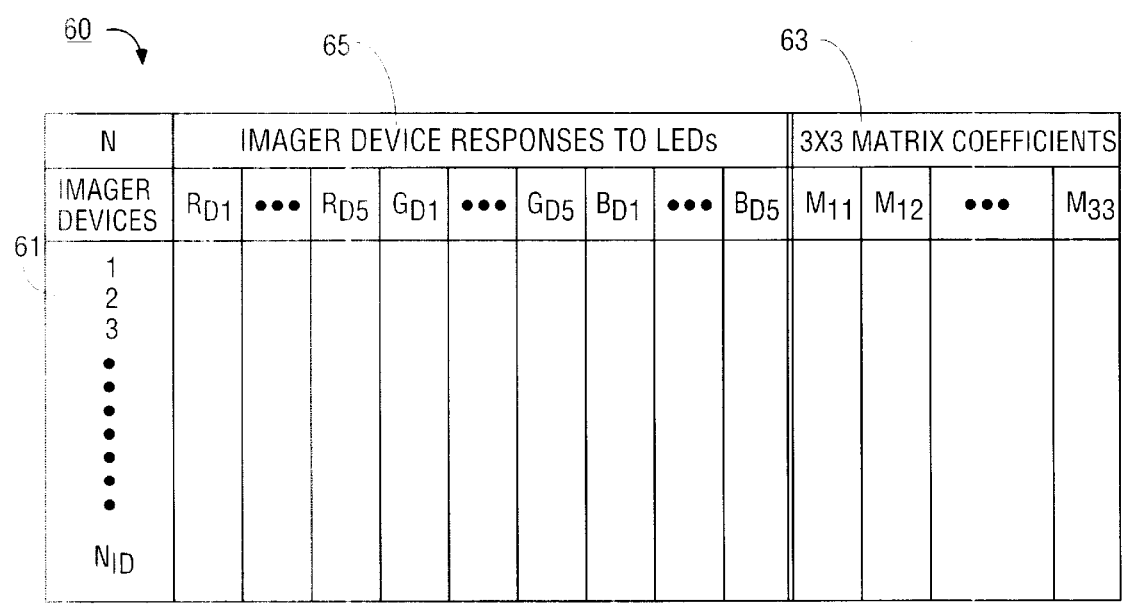

FIG. 5 illustrates another exemplary embodiment of the present invention. This example may include Macbeth Colorchecker® simulation through statistical correlation with LED responses. To aid in the understanding of this exemplary method, FIG. 6 will be used. FIG. 6 illustrates table 60 showing a plurality ($N_{ID}$) of tested imager devices 61 having imager device responses 65 to the twenty-four reflective color target chips of the Macbeth Colorchecker® rendition chart. Imager device responses 65 may be RGB responses. The Macbeth Colorchecker® reflective color target chips are defined by the color calibrating coefficients $M_{11}, \ldots, M_{33}$ of the 3×3 matrix coefficients 63. The 3×3 matrix coefficients 63 are plotted with the corresponding imager device responses 65 to the five LEDs 14 of FIG. 3. Once a sufficient quantity of imager devices 61 are calibrated, the accumulated data (63 and 65) may then be used to determine the statistical correlation between the imager device responses 65 and the 3×3 matrix coefficients 63.

Figure 9:
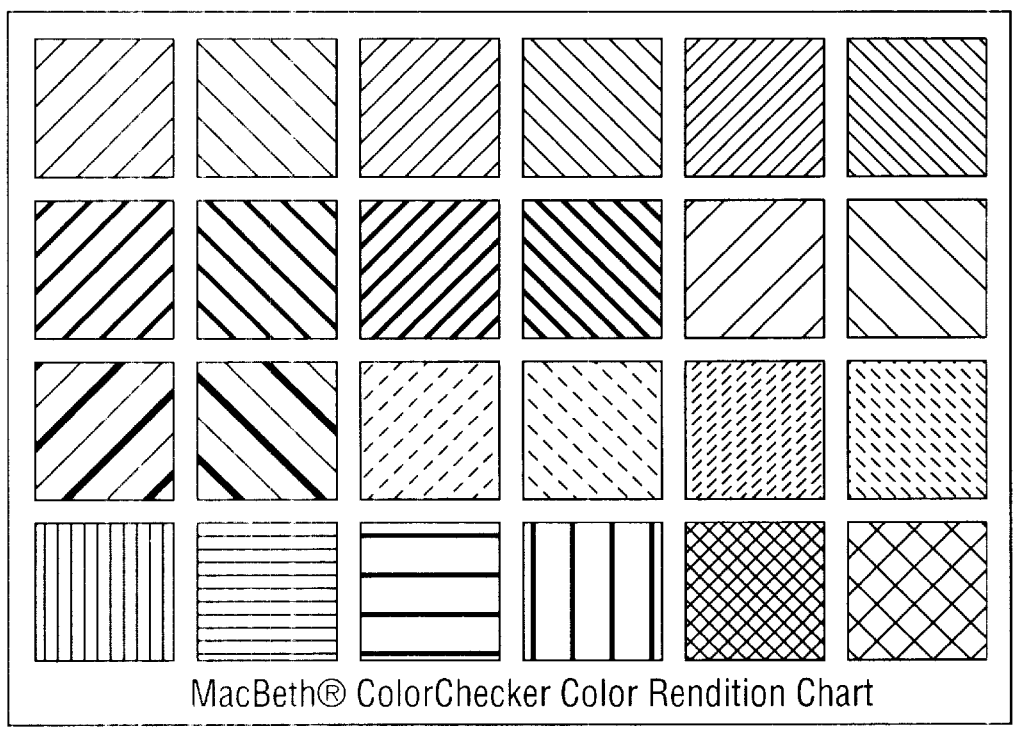
FIG. 9 illustrates target color chips of a Macbeth Colorchecker® color rendition chart.

FIG. 5 will now illustrate the procedure in more detail. Block 51 illustrates an imager device to be calibrated being exposed to twenty-four reflective color targets corresponding to the Macbeth Colorchecker®. FIG. 9 illustrates target color chips of a Macbeth Colorchecker® color rendition chart. However, other color targets may be used provided the XYZ tristimulus values of the targets are known. Further, the number of targets may be varied according to a desired result. Block 52 illustrates a 3×3 color calibrating matrix being constructed from the stored or recorded RGB values of the twenty-four targets. This procedure has been previously described in the Background Information section above. Let the 3×3 matrix resulting from the color calibration using the color targets be represented by:

$$M_{3\times3} = \begin{matrix} M_{11} & M_{12} & M_{13} \\ M_{21} & M_{22} & M_{23} \\ M_{31} & M_{32} & M_{33} \end{matrix}$$

Where $M_{11}, \ldots, M_{33}$ are the color calibrating coefficients of the color calibrating matrix.

Block 53 illustrates the same imager device being stimulated by a series of five LEDs and the RGB responses for the five LEDs recorded. The imager device under test is illuminated sequentially by all five LEDs and a total of fifteen responses (five LEDs multiplied by three RGB colors) are recorded. Taking the five LEDs employed to be LED#1–LED#5, let $R_{D1}$ represent the imager's red channel response to LED#1. Similarly, let $G_{D1}$ represent the imager's green channel response to LED#1 and so forth. The imager device responses can be represented as:

$R_{D1}, G_{D1}, B_{D1}$ is the imager RGB response to LED#1
$R_{D2}, G_{D2}, B_{D2}$ is the imager RGB response to LED#2
$R_{D3}, G_{D3}, B_{D3}$ is the imager RGB response to LED#3
$R_{D4}, G_{D4}, B_{D4}$ is the imager RGB response to LED#4
$R_{D5}, G_{D5}, B_{D5}$ is the imager RGB response to LED#5

Block 54 illustrates blocks 51 to 53 being repeated until a desired number of imager devices have been calibrated. From the combined accumulated data, a table such as the one illustrated in FIG. 6 may be constructed. Blocks 55 to 56 illustrate the steps that once enough data has been accumulated, polynomial regression may be used to determine the correlation between the statistical correlation between the 3×3 matrix coefficients 63 and the imager device responses 65. Polynomial regression is based on the theory that, through the use of simultaneous equations, a correlation between measured variable responses can be approximated. Polynomial regression is well known in linear algebra, however, further discussion of the polynomial regression method in the context of imager devices may be found in Henry R. Kang, "Color Technology for Electronic Imaging Devices" (SPIE Optical Engineering Press) at pages 55–62. In summary, using data obtained from multiple imager devices, statistical regression is used to find the correlation between the imager devices' responses 65 to LEDs and the coefficients 63 of the 3×3 matrix obtained from of the same imager device using color targets. The net result is a set of equations of the form:

$M_{11} = P_0 + P_1 * R_{D1} + P_2 * G_{D1} + P_3 * B_{D1} + P_4 * R_{D2} + P_5 * G_{D2} + P_6 * B_{D2} + P_7 * R_{D3}$
$+ P_8 * G_{D3} + P_9 * B_{D3} + P_{10} * R_{D4} + P_{11} * G_{D4} + P_{12} * B_{D4} + P_{13} * R_{D5} + P_{14} * G_{D5} + P_{15} * B_{D5}$ where the values $P_0, \ldots, P_{15}$ represent the correlation coefficients to be statistically determined. The correlation coefficients may be determined through well known statistical methods or alternatively, by using a statistics analysis program such as JMP commercially available from SAS Institute, Inc., Cary, N.C. In any event, a different set of correlation coefficients must be determined for each color calibrating coefficients of the color calibration matrix (i.e. $M_{11}, M_{12} \ldots M_{33}$) which is represented by blocks 57 to 58. Block 59 illustrates that once the set of equations correlating the calibrating coefficients of the 3×3 matrix 63 and the imager device response to five LEDs 65 is obtained, the color targets are no longer necessary and the set of equations is used for subsequent color calibration of the imager devices. The advantage of this approach is that the color calibration coefficients are determined through indirect comparison with a "golden standard" without the continuing use of the Macbeth Colorchecker®.

Figure 7:
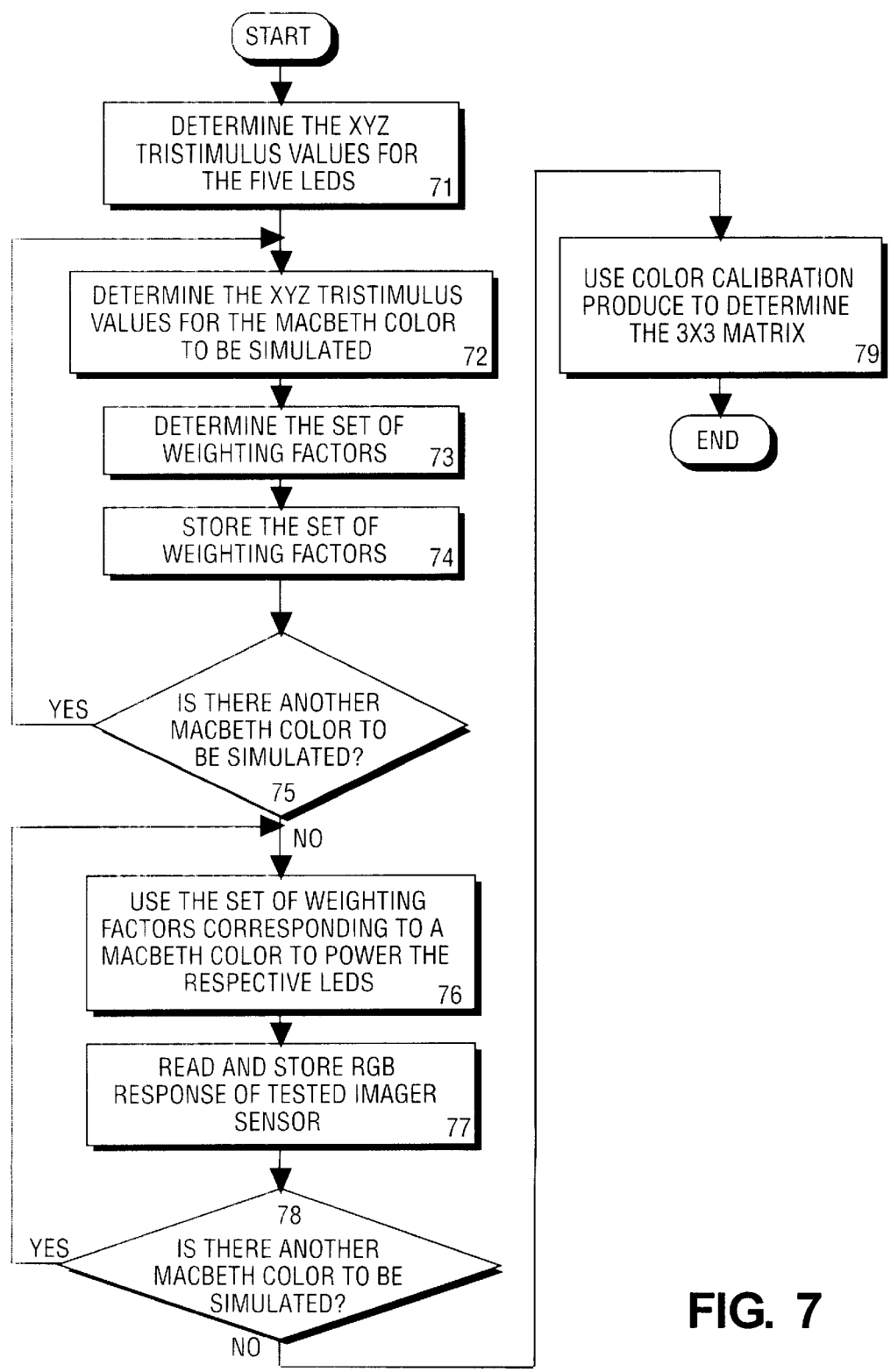
FIG. 7 illustrates an exemplary embodiment of the present invention that uses sets of weighting factors.

FIG. 7 illustrates another embodiment of the present invention. This example involves the simulation of colors of the Macbeth Colorchecker® through a combination of LEDs lighted simultaneously. In other words, by using the LED lights as the basis, a combination of the LED lights powered simultaneously according to sets of weighting factors give the same color characteristics as the Macbeth Colorchecker® targets under standard CIE D65 illumination. The simulated colors are presented one at a time to the imager device and the associated RGB responses are recorded. The color calibration is then performed in a similar manner as that performed when using color targets. This color target calibration procedure has been described in the Background Information section above. FIG. 7 illustrates the exemplary method in more detail. Block 71 illustrates the step of determining the XYZ tristimulus values of the LEDs. This may be done through the use of a spectrophotometer. Let the five LEDs be represented as:

$X_{D1}, Y_{D1}, Z_{D1}$ is the XYZ Tristimulus Value for LED#1
$X_{D2}, Y_{D2}, Z_{D2}$ is the XYZ Tristimulus Value for LED#2
$X_{D3}, Y_{D3}, Z_{D3}$ is the XYZ Tristimulus Value for LED#3
$X_{D4}, Y_{D4}, Z_{D4}$ is the XYZ Tristimulus Value for LED#4
$X_{D5}, Y_{D5}, Z_{D5}$ is the XYZ Tristimulus Value for LED#5

Block 72 illustrates the step of determining the XYZ tristimulus values of the Macbeth colors to be simulated that are represented as:

$X_{Mac1}, Y_{Mac1}, Z_{Mac1}$ is the XYZ Tristimulus Value for Macbeth Color#1

$X_{Mac2}, Y_{Mac2}, Z_{Mac2}$ is the XYZ Tristimulus Value for Macbeth Color#2

$X_{Mac24}, Y_{Mac24}$, is the $Z_{Mac24}$–XYZ Tristimulus Value for Macbeth Color#24

Block 73 illustrates the step of determining a set of weighting factors that is applied to the LEDs to allow simulation of the Macbeth color. The relationship can be expressed as:

$$\begin{bmatrix} X_{Mac1} \\ Y_{Mac1} \\ Z_{Mac1} \end{bmatrix} = \begin{bmatrix} X_{D1} & X_{D2} & X_{D3} & X_{D4} & X_{D5} \\ Y_{D1} & Y_{D2} & Y_{D3} & Y_{D4} & Y_{D5} \\ Z_{D1} & Z_{D2} & Z_{D3} & Z_{D4} & Z_{D5} \end{bmatrix} \begin{bmatrix} f_{1,1} \\ f_{1,2} \\ f_{1,3} \\ f_{1,4} \\ f_{1,5} \end{bmatrix}$$

Where $(f_{1,1}, \ldots f_{1,5})$ is the set of weighing factors.
The above relationship can be rewritten as:

$$\begin{bmatrix} X_{Mac1} \\ Y_{Mac1} \\ Z_{Mac1} \end{bmatrix} = [M_{LED}] \begin{bmatrix} f_{1,1} \\ f_{1,2} \\ f_{1,3} \\ f_{1,4} \\ f_{1,5} \end{bmatrix}$$

A similar expression can be written for each Macbeth color:

$$\begin{bmatrix} X_{Mac2} \\ Y_{Mac2} \\ Z_{Mac2} \end{bmatrix} = [M_{LED}] \begin{bmatrix} f_{2,1} \\ f_{2,2} \\ f_{2,3} \\ f_{2,4} \\ f_{2,5} \end{bmatrix} \text{(etc.)}$$

In the above expressions, the first subscript on the weighting factor $f$ refers to the Macbeth color being matched (i.e., 1–24). The second subscript refers to the LED (i.e., 1–5) associated with the weighting factor.

The above relationship can be rewritten to determine the set of weighting factors required for simulation as:

$$\begin{bmatrix} f_{1,1} \\ f_{1,2} \\ f_{1,3} \\ f_{1,4} \\ f_{1,5} \end{bmatrix} = ([M_{LED}]^T [M_{LED}])^{-1} [M_{LED}]^T \begin{bmatrix} X_{Mac1} \\ Y_{Mac1} \\ Z_{Mac1} \end{bmatrix}$$

Where $[M_{LED}]^T$ is the transpose matrix of $[M_{LED}]$. The five LEDs selected should have the basis which can describe all of the colors of the Macbeth Colorchecker®. However, if this condition is not met exactly, substitute synthesizable colors may be used which are close approximations to the Macbeth colors. Alternately, different light sources could be selected to better span the required color space. In this instance, the five LEDs have peak wavelengths at 430, 470, 545, 590 and 660 nm respectively.

Block 74 illustrates storing the obtained set of weight factors from above. Block 75 illustrates blocks 71 to 74 being repeated to find the set of weighting factors for each of the Macbeth colors to be simulated. Blocks 76 to 78 illustrate that once the twenty-four sets of weighting factors have been stored corresponding to the respective Macbeth colors, the five LEDs are simultaneously illuminated with the drive power in the proportions indicated by the weighting factors. An image of the color is captured by the tested imager device and the RGB responses recorded. In total, twenty-four images are captured to accumulate the total system response to the twenty-four colors of the Macbeth Colorchecker®. Block 79 illustrates the responses are then used by the color calibration procedure which has been described in the background information to produce the 3×3 color calibrating matrix 63.

The advantage to this approach is that the equivalent Macbeth colors are directly synthesized and may therefore be directly measured by a spectrophotometer to determine the accuracy of the color rendition. This would provide a convenient method of verifying that the calibration instrument is itself in calibration (i.e., it provides a method of calibration traceability).

Figure 8:
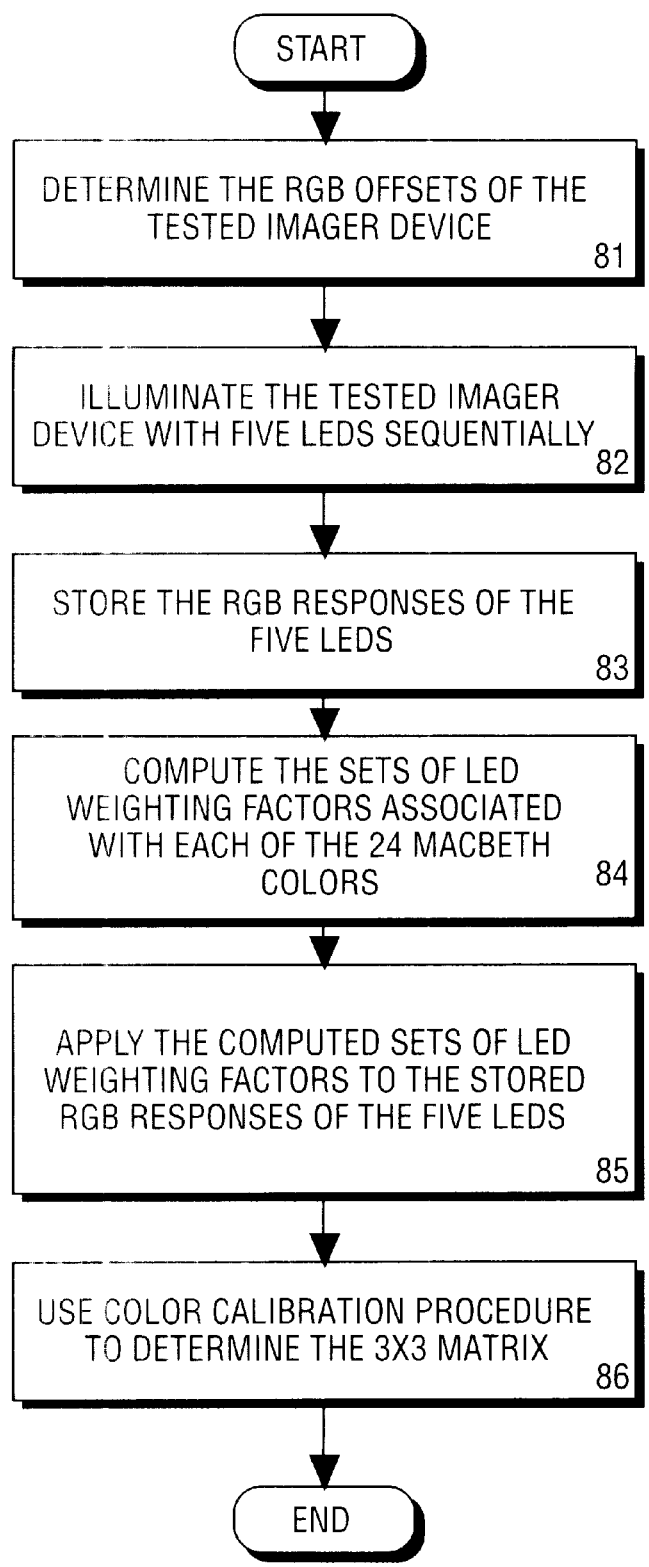
FIG. 8 illustrates another exemplary embodiment of the present invention using sets of weighting factors.

FIG. 8 illustrates another embodiment of the present invention. In this exemplary method, rather than synthesizing the Macbeth colors with LEDs, a knowledge of the system responses to the LED stimulus is employed to determine and predict what the system response would be to the standard Macbeth colors. These predictions are then used to provide the response data required in the color calibration to produce the 3×3 color calibrating matrix. The method is premised on linearity of system response, and on the presumption that the LEDs have the basis that can describe all of the colors of the Macbeth Colorchecker®. If this presumption is not met exactly, substitute colors may be used.

Block 81 illustrates the step of determining the intercept of the tested imager device's RGB responses for zero input. This step is performed to determine the offsets of the imager device to be calibrated. The purpose is to allow more accurate linear interpolation of results. As an example, for an imager device with positive offsets, the correction for offset may be an essentially equivalent to a dark frame subtraction (i.e., offset corresponding to the imager device's response to the dark).

We will term these offsets $R_0$, $G_0$, $B_0$. For example:

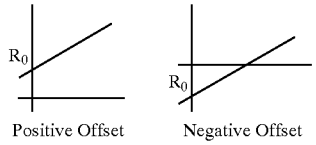

Positive Offset        Negative Offset

Block 82 illustrates the step of illuminating the imager device with each of the five LEDs and recording the imager responses for each LED. Let the imager device responses to the LEDs be represented by:

$R_{D1}$, $G_{D1}$, $B_{D1}$ is the imager RGB response to LED#1
$R_{D2}$, $G_{D2}$, $B_{D2}$ is the imager RGB response to LED#2
$R_{D3}$, $G_{D3}$, $B_{D3}$ is the imager RGB response to LED#3
$R_{D4}$, $G_{D4}$, $B_{D4}$ is the imager RGB response to LED#4
$R_{D5}$, $G_{D5}$, $B_{D5}$ is the imager RGB response to LED#5

Block 83 illustrates storing the above imager device responses to the five LEDs.

Block 84 illustrates the step of computing the set of weighting factors associated with each of the twenty-four Macbeth colors. The procedure for determining the set of weighting factors has been described with respect to FIG. 7.

Block 85 illustrates applying the computed sets of weighting factors to the imager device's RGB responses to the five LEDs to determine the equivalent Macbeth color response:

For example:

$R_1 = f_{1.1}(R_{D1} - R_0) + R_0 +$     $G_1 = f_{1.1}(G_{D1} - G_0) + G_0 +$
$\quad f_{1.2}(R_{D2} - R_0) + R_0 +$     $\quad f_{1.2}(G_{D2} - G_0) + G_0 +$
$\quad f_{1.3}(R_{D3} - R_0) + R_0 +$     $\quad f_{1.3}(G_{D3} - G_0) + G_0 +$
$\quad f_{1.4}(R_{D4} - R_0) + R_0 +$     $\quad f_{1.4}(G_{D4} - G_0) + G_0 +$
$\quad f_{1.5}(R_{D5} - R_0) + R_0$       $\quad f_{1.5}(G_{D5} - G_0) + G_0$ $\vdots$                                  $\vdots$ $R_{24} = f_{24.1}(R_{D1} - R_0) + R_0 +$ $G_{24} = f_{24.1}(G_{D1} - G_0) + G_0 +$
$\quad f_{24.2}(R_{D2} - R_0) + R_0 +$    $\quad f_{24.2}(G_{D2} - G_0) + G_0 +$
$\quad f_{24.3}(R_{D3} - R_0) + R_0 +$    $\quad f_{24.3}(G_{D3} - G_0) + G_0 +$
$\quad f_{24.4}(R_{D4} - R_0) + R_0 +$    $\quad f_{24.4}(G_{D4} - G_0) + G_0 +$
$\quad f_{24.5}(R_{D5} - R_0) + R_0$      $\quad f_{24.5}(G_{D5} - G_0) + G_0$ $B_1 = f_{1.1}(B_{D1} - B_0) + B_0 +$
$\quad f_{1.2}(B_{D2} - B_0) + B_0 +$
$\quad f_{1.3}(B_{D3} - B_0) + B_0 +$
$\quad f_{1.4}(B_{D4} - B_0) + B_0 +$
$\quad f_{1.5}(B_{D5} - B_0) + B_0$ $\vdots$ $B_{24} = f_{24.1}(B_{D1} - B_0) + B_0 +$
$\quad f_{24.2}(B_{D2} - B_0) + B_0 +$
$\quad f_{24.3}(B_{D3} - B_0) + B_0 +$
$\quad f_{24.4}(B_{D4} - B_0) + B_0 +$
$\quad f_{24.5}(B_{D5} - B_0) + B_0$ Block 86 illustrates the use the computed equivalent responses from above which is loaded into a MEAS table as described in the Background Information section above and the color calibration procedure performed to determine the 3×3 color calibration matrix.

This method only requires capturing five frames (i.e., one frame for each LED) and yet, is capable of determining the color calibration matrix as if the calibration had been performed using twenty-four reflective color targets.

It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of color calibrating an imager device, comprising:

radiating a light from a plurality of different light radiation sources, the plurality of different light radiation sources having different spectral radiation characteristics and having known color values;

illuminating the imager device with the light to produce a set of color channel responses; and determining color calibrating coefficients for the imager device from the set of color channel responses and the known color values.

2. The method of claim 1 wherein the light is a series of lights, wherein the number of the plurality m is no less than 3, wherein the number of the set n is no less than three and no more than m, and wherein the color values are a priori color values.

3. The method of claim 1, further comprising:

storing the color calibrating coefficients in the imager device.

4. The method of claim 1, wherein presenting a plurality of light radiating sources includes presenting three to more than five light emitting diodes.

5. The method of claim 4, wherein presenting three to more than five light emitting diodes includes presenting five light emitting diodes having the peak wavelengths of 430 nm, 470 nm, 545 nm, 590 nm, and 660 nm, respectively.

* * * * *